(No Model.)
T. ROSE.
REFRIGERATING AND APPARATUS THEREFOR.
No. 309,494. Patented Dec. 16, 1884.
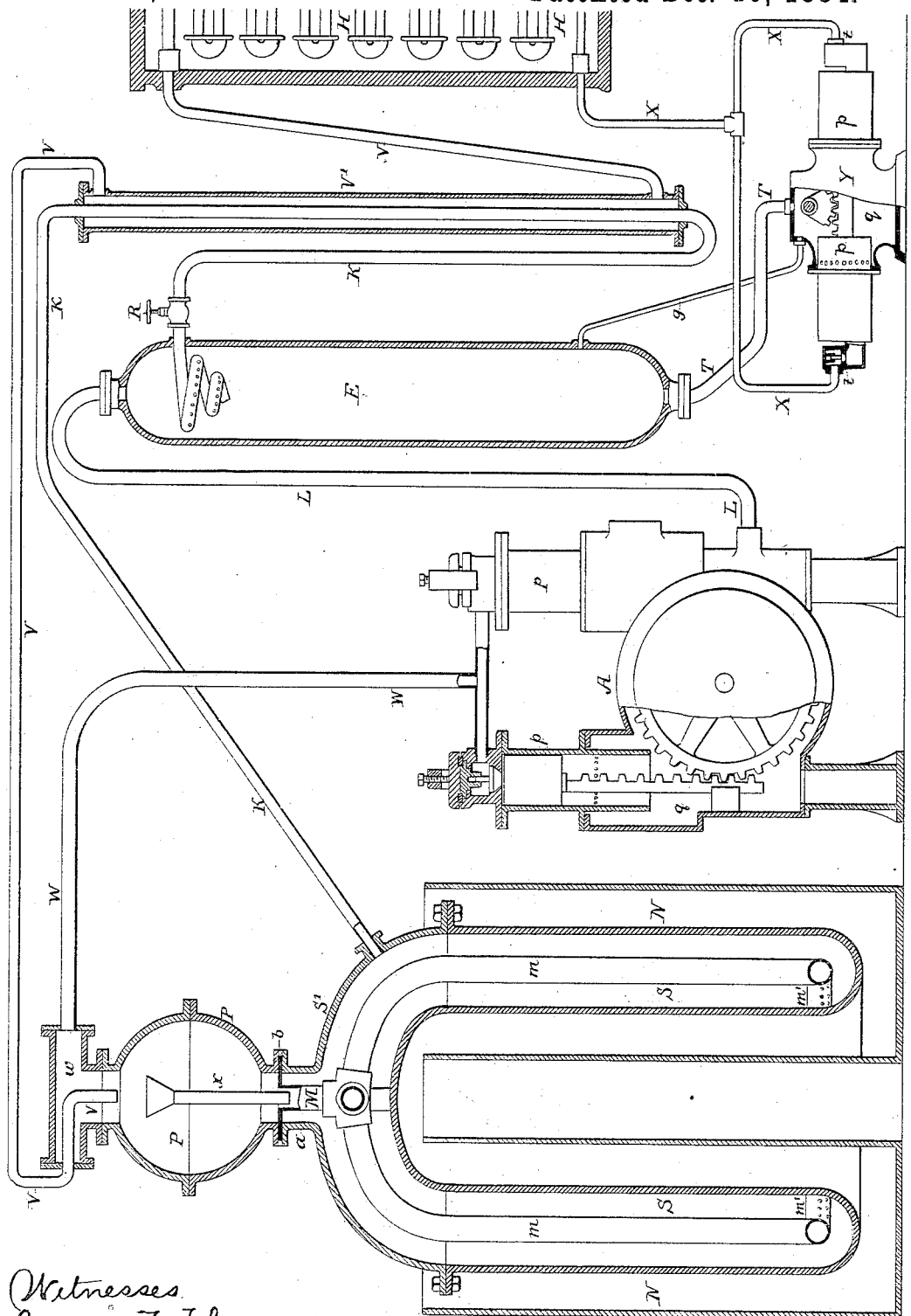

UNITED STATES PATENT OFFICE.

THOMAS ROSE, OF BROOKLYN, NEW YORK, ASSIGNOR TO DUDLEY S. STEELE AND NATHAN W. CONDICT, JR., OF JERSEY CITY, NEW JERSEY.

REFRIGERATING AND APPARATUS THEREFOR.

SPECIFICATION forming part of Letters Patent No. 309,494, dated December 16, 1884.

Application filed April 17, 1884. (No model.)

*To all whom it may concern:*

Be it known that I, THOMAS ROSE, a subject of the Queen of Great Britain and Ireland, and a resident of Brooklyn, New York, have invented certain Improvements in Refrigerating and Apparatus therefor, of which the following is a specification.

My invention consists, mainly, in cooling a refrigerating-chamber by subjecting a strong ammoniacal solution, or other volatile hydrate derived from an absorber, to a partial vacuum in a vacuum-chamber, forcing the gas evolved therein to the said absorber, permitting the weak solution to flow by its own gravity from the vacuum-chamber into the chamber and barrels of a pump, and forcing it from the latter, through refrigerating-pipes, to the absorber, all substantially as set forth hereinafter.

My invention further consists of certain apparatus for carrying the main feature of my invention into effect and for producing other results, all of which are fully set forth hereinafter.

The figure in the accompanying drawing represents my improved refrigerating apparatus, partly in section.

The absorber S, which is preferably made of cast-iron, consists, in the present instance, of an annular vessel having a dome-like top, S', the annular portion of the vessel being contained in an annular tank, N, through which water or other cooling-liquid is caused to circulate. This absorber and the peculiar manner of making it are the invention of N. W. Condict, Jr., who has made application for a patent bearing even date herewith, for this feature; hence it will suffice to remark here that this form of absorber is not essential in carrying out the main features of my invention, but has been adopted because it exposes an extended surface to the cooling influences of water circulated through the tank. The absorber terminates at the top in a flanged neck, $a$, to which is secured the vessel P, preferably made of the spherical form represented in the drawing. A plate or diaphragm, $b$, is confined between the neck $a$ of the condenser and the vessel P, but the plate has a central opening communicating with a pipe, M, which has branches $m$ extending downward into and nearly to the bottom of the absorber, and terminating in perforated segments $m'$, as fully set forth in the said application for a patent made by the said N. W. Condict, Jr.

A is a vacuum-pump preferably made in accordance with that described in an application for a patent filed by the said Condict, March 31, 1884, Serial No. 126,098, and consisting of an inlet-chamber, $q$, into which project portions of two barrels, $p\ p$, having pistons reciprocated from a rock-shaft through the medium of a cog-wheel and racks attached to the pistons. The portions of the barrels which project into the inlet-chamber have perforations through which the gases to be forced can pass into the barrels when the pistons are depressed. The discharge-pipe W of this pump A communicates with the vessel P, and the inlet-pipe L of the pump with the vacuum-chamber E at the top of the same, the pipe K, which communicates with the absorber having its termination within the vacuum-chamber, the termination being in the present case in the form of a perforated helix, so as to deliver the solution from the absorber into the said chamber in numerous dispersed jets. The pipe is furnished with a suitable valve or cock, R, which, as will be seen hereinafter, controls the operation of the apparatus.

The refrigerating structure H may be constructed for making ice, for cooling air or brine, or for any other purpose demanding a low temperature, the structure containing a system of pipes or passages with which communicates the force-pipe X of the pump Y. I prefer to make the pump Y substantially like the pump A, excepting that in the former, portions of barrels $p\ p$ project horizontally into an inlet-chamber, $q$, which has a direct communication through a pipe, T, with the bottom of the vacuum-chamber E, the outer ends of the barrels being provided with check-valves $t\ t$ and the two force-pipes X communicating with the lowest of the system of pipes in the refrigerating-chamber, the highest of these pipes communicating through a pipe, V, of which a vessel, V', larger than the pipe in the present instance, forms a part, the said pipe V extending into a small chamber, $w$, above the vessel P and terminating above the funnel-shaped top of a tube, $x$, which extends a short distance into the pipe M without interfering with the free communication of the vessel P with the latter pipe.

Whatever style of pump Y may be used for forcing the liquid through the system of refrigerating-pipes, it must be so far below the vacuum-chamber E that the liquid can flow by its own gravity into the inlet-chamber and barrels of the pump. Supposing the absorber S to be full of a solution of ammonia at a strength of from 890° to 900° specific gravity, and air to have been exhausted from the pump A and its inlet-chamber, and the cock R to be opened, the following actions will take place: A portion of the ammonical solution will flow from the absorber S through the pipe K into the vacuum-chamber E in the condition of dispersed jets. As the solution is brought under the influence of the partial vacuum induced by the operation of the pump A, it will at once give up a large portion of its gas, and the effect of this will be to lower the temperature of the solution from which the gas was evolved. The quantity of solution admitted to the vacuum-chamber in a given time by the adjustment of the cock R will determine the degree of cold obtained, which may range anywhere between the temperature of the solution in the absorber and zero, Fahrenheit. The cold and weak solution from the vacuum-chamber flows directly into the inlet-chamber of the pump, and is forced through the pipes or passages of the refrigerating-chamber, and thence through the pipe V, whence it escapes into the top of the pipe $x$, and thence into the pipe M, and is finally dispersed into the absorber through the perforations of the above-mentioned segments $m'$. There will be a constant circulation of the solution from the absorber through the pipe K, vacuum-chamber E, circulating-pump Y, refrigerating pipes or passages, and through the pipe V back to the absorber. As regards the gas evolved from the solution in the vacuum-chamber, it passes through the pipe L into the inlet-chamber of the pump A, and is forced by the latter into the absorber S, and there absorbed. It will thus be seen that while there is a constant circulation of the solution from and to the absorber, during which circulation gas is evolved, and the solution thereby reduced in temperature to cool the refrigerator, the gas evolved is forced into the absorber, where it unites with the weak solution, which has performed its cooling duties, preparatory to the recirculation of this solution strengthened by the absorbed gas.

The object of the vessel V', through which the pipe K passes in its course from the absorber to the vacuum-chamber, and with which the pipe V communicates, is to utilize the low temperature which the spent solution still possesses after it leaves the refrigerating-pipes, this solution cooling that portion of the pipe K which passes through the vessel V', and consequently lowering the temperature of the strong solution during its course from the absorber to the vacuum-chamber. It is advisable to use a pipe, $g$, forming a communication between the chamber E and the inlet-chamber $q$ of the pump Y, so that there may be the same partial vacuum in both chambers, and so that the free flow of the cold solution by its own gravity from the vacuum-chamber to the pump-chamber may be assured. The vessel P forms a gas-chamber, and serves the twofold purpose of securing a uniform flow of gas through the pipes M $m$ when the apparatus is in operation, and prevents the return of any solution from the absorber through the pipe M when the apparatus is at rest. The enlargement $w$ of the pipe W above the vessel P is for the purpose of admitting the terminal portion of the pipe V, as shown, the spent solution flowing from this pipe into the funnel-shaped top of the pipe $x$, through which it passes with the gas into the pipe M, and with the gas is distributed into the absorber at the bottom of the same. Of course as much heat is generated by the reabsorption of gas in the absorber as there is cold produced by separating the gas from the water which contained it in the vacuum-chamber, and this heat is disposed of by maintaining a constant flow of condensing water in the tank N, in which water the main portion of the absorber is submerged. The diaphragm-plate $b$ cuts off all communication between the vessel P and condenser except through the pipes M $m$.

Mercury-gages are applied to suitable parts of the apparatus to indicate the partial vacuum in the inlet-chamber of the pump A and the pressure in the absorber, which is generally an atmospheric pressure maintained by the joint action of the pump A and valve R. Means should also be provided for ascertaining the temperature of the currents at desirable points. The valve R controls the whole machine, and this is adjusted to accord with any desired height of mercury in the gage, the more the valve is opened the farther will the mercury be lowered and the mercury rising as the valve is partly closed.

The arrangement of the several parts of the apparatus in relation to each other, as shown in the drawings, is made with the view of clearly exhibiting the invention, a more compact arrangement being adopted in building the apparatus.

As regards the main feature of my invention, it is not essential to adhere to the precise construction of the apparatus shown in the drawings.

I claim as my invention—

1. The mode herein described of cooling a refrigerating-chamber, the said mode consisting in subjecting a strong ammoniacal solution or other volatile hydrate derived from an absorber to a partial vacuum in a vacuum-chamber, forcing the gases evolved therein to the said absorber, permitting the weak solution to flow by its own gravity from the said vacuum-chamber into a pump-chamber, and forcing it from the latter through pipes or passages of the refrigerator to the absorber, all substantially as set forth.

2. The mode herein described of cooling the strong solution in its course from the absorber to the vacuum-chamber, the said mode consisting in subjecting the strong solution to the cooling influences of the weak solution as the latter is being forced from the refrigerating pipes or passages to the absorber, substantially as specified.

3. The combination, in refrigerating apparatus, of the following elements, namely: first, an absorber; second, a vacuum-chamber communicating with the absorber; third, a pump for creating a partial vacuum in the said chamber, and for forcing the gas evolved therein into the absorber; fourth, a system of refrigerating pipes or passages also communicating with the absorber; and, fifth, a pump situated between the refrigerating-pipes and vacuum-chamber, and so far below the latter that the cold solution will flow by its own gravity into the inlet-chamber and barrel of the said pump prior to being forced thereby through the refrigerating-pipes to the absorber, all substantially as described.

4. The combination of the absorber, vacuum-chamber, refrigerating-pipes, pumps, and their several connections, with a valve, R, for regulating the flow of strong solution through the pipe K, and thereby serving to regulate the action of the entire apparatus, substantially as set forth.

5. The combination of the pipe V, through which the spent solution is forced to the absorber, and the vessel V', communicating with the said pipe, with the pipe K, which passes through the said vessel, and through which the strong solution is introduced to the vacuum-chamber, substantially as described.

In testimony whereof I have signed my name to this specification in the presence of two subscribing witnesses.

THOMAS ROSE.

Witnesses:
OTTO CROUSE,
FRANCIS J. McGOWEN.